(12) United States Patent
Kulczyk et al.

(10) Patent No.: US 7,647,208 B2
(45) Date of Patent: Jan. 12, 2010

(54) SIGNAL PROCESSING METHOD AND APPARATUS

(75) Inventors: Konrad Kulczyk, Farnborough (GB); Anthony Palmer, Farnborough (GB); James Ewing, Farnborough (GB)

(73) Assignee: Weston Aerospace Limited, Farnborough, Hampshire (GB)

( * ) Notice: Subject to any disclaimer, the term of this patent is extended or adjusted under 35 U.S.C. 154(b) by 500 days.

(21) Appl. No.: 11/054,540

(22) Filed: Feb. 10, 2005

(65) Prior Publication Data

US 2005/0288907 A1 Dec. 29, 2005

(30) Foreign Application Priority Data

Feb. 12, 2004 (GB) ................................. 0403179.5

(51) Int. Cl.
*H04B 15/00* (2006.01)
*H03F 1/26* (2006.01)

(52) U.S. Cl. ............................ 702/189; 702/57; 702/69; 370/516; 375/226; 375/227; 708/290; 708/530; 700/6; 700/121

(58) Field of Classification Search .................. 702/57, 702/66, 69, 189; 370/516, 464, 468; 375/226, 375/227; 708/290, 530; 700/100, 6, 121
See application file for complete search history.

(56) References Cited

U.S. PATENT DOCUMENTS

| 3,932,813 | A |   | 1/1976  | Gallant ........................ 324/164 |
|-----------|---|---|---------|------------------------------------------|
| 3,984,713 | A |   | 10/1976 | Presley ........................ 310/155 |
| 4,718,013 | A |   | 1/1988  | Kubo                                     |
| 4,764,871 | A |   | 8/1988  | van Zanten                               |
| 5,067,096 | A | * | 11/1991 | Olson et al. .................. 102/425  |
| 5,400,268 | A |   | 3/1995  | Katsuda et al.                           |
| 5,539,852 | A |   | 7/1996  | Gallagher .................... 388/811   |
| 5,903,605 | A | * | 5/1999  | Crittenden ................... 375/226   |
| 5,960,097 | A | * | 9/1999  | Pfeiffer et al. ............... 382/103  |
| 6,005,364 | A | * | 12/1999 | Acarnley ..................... 318/632   |
| 6,249,712 | B1| * | 6/2001  | Boiquaye ..................... 700/31    |

(Continued)

FOREIGN PATENT DOCUMENTS

EP 0 495 693 7/1992

(Continued)

OTHER PUBLICATIONS

Mule et al., 'Electrical and Optical Clock Distribution Networks for Gigascale Microprocessors', Oct. 2002, IEEE Publication, vol. 10, No. 5, pp. 582-594.*

(Continued)

*Primary Examiner*—Edward Raymond
*Assistant Examiner*—Elias Desta
(74) *Attorney, Agent, or Firm*—Nixon & Vanderhye P.C.

(57) ABSTRACT

A method for generating a series of output signals represented by a series of measurement signals which is particularly useful in the compensation for jatter, missing spurious pulses or plates when applied to the processing of signals from a speed probe monitoring the speed of a rotating bladed shaft. The method includes the steps of predicting a value for a first measurement signal from a historical measurement signal value, generating a first output signal from the predicted value of the first measurement signal; comparing the measurement signal to its predicted value, and: if the measurement signal is within a predetermined range of acceptable values, using the first measurement signal to predict a value for a second measurement signal; if the measurement signal is outside the pre-determined range of acceptable values, using the first predicted value to predict a second measurement signal, and generating a second output signal from the predicted value of the second measurement signal.

19 Claims, 12 Drawing Sheets

Block diagram of the predictor-limiter measuring system

U.S. PATENT DOCUMENTS

| | | |
|---|---|---|
| 6,363,318 B1 | 3/2002 | Wang et al. |
| 6,381,555 B1 | 4/2002 | Sewell ........................ 702/181 |
| 6,490,497 B1 * | 12/2002 | Mitsuhashi et al. ......... 700/121 |
| 6,622,059 B1 * | 9/2003 | Toprac et al. ............... 700/121 |
| 6,853,920 B2 * | 2/2005 | Hsiung et al. .................. 702/1 |

FOREIGN PATENT DOCUMENTS

| | | |
|---|---|---|
| GB | 2 223 103 A | 3/1990 |
| GB | 2 265 221 A | 9/1993 |
| GB | 850182 | 9/1996 |

OTHER PUBLICATIONS

Mimnagh et al., 'Helicopter Drive System Diagnostics Through Multivariate Statistical Process Control', May 2000, U.S. Department of Navy Publication, pp. 381-415.*

EP Search Report dated Apr. 16, 2009 for EP 08254075.8, 5 pages.

* cited by examiner

Compressor blade positions

Block diagram of the predictor-limiter measuring system

SIGNAL PROCESSING METHOD AND APPARATUS

SIGNAL PROCESSING METHOD AND APPARATUS

The present invention is concerned with signal processing methods and apparatus. Embodiments of the invention are concerned with method and apparatus for processing signals to compensate for possible errors in the measurement of the signals. Embodiments of the invention are particularly concerned with the improved processing of distorted signals with low signal to noise ratios.

Embodiments of the invention are particularly suited to the processing of a sequence of signals or measurements which change over time.

The invention could be used in connection with any system in which a parameter which may vary over time is monitored. Embodiments are suitable for improved processing of virtually any such parameter; position, speed, force, acceleration etc.

One embodiment of the invention might be in combination with a position monitoring system (e.g. for control of a robotic arm). Another (described below in more detail) might be in combination with a system for monitoring the speed of a rotating shaft.

In FIG. 1, line a-b represents true (unknown) values of the measured parameter y which varies with time. The points show the measured values of this signal in equal time intervals. These measured values should be processed in such a way to obtain results lying as close as possible to the line.

The known techniques for processing signals of this type to reduce errors or distortions such as those arising from missing signals or spurious signals include filtering and linear prediction.

Filtering:

Digital filtering is a very powerful technique normally used for this type of application. However filters introduce delay into the output signal because they process past information. For example, if we average a linearly varying signal over 29 readings, the output from the filter will correspond to the value of the 15 th reading. This results in increasingly large errors from the true value as the rate change is increasing. Also a filter will not cope with large values of distorted measurement, and this will result in large errors.

Linear Prediction:

Linear prediction is a well known technique and the signals varying linearly do not suffer a constant delay. However this technique, like other filters, also generates large errors when processing significantly distorted signals. This error can be reduced by using a large number of measurements for prediction calculation, but this will affect the response time and will cause large errors when the rate of change of signal is changing.

The inventors of the subject invention were the first to appreciate that it was possible to compensate errors and distortion by taking the counter-intuitive step of using predicted times based on adjusted or filtered historical times to determine speed, whilst using actual measured times, to predict times. The apparently counter-initiative step of not using actual live measurements allows one to easily and effectively compensate signal errors and distortion.

A particular preferred embodiment of the invention may be used to generate a sequence of outputs or signals representing the speed of a gas turbine. The invention easily and effectively compensates for jitter, missing and spurious pulses or blades when applied to the processing of signals from a speed probe monitoring the speed of a rotating bladed shaft.

The shaft speed of a bladed element such as a gas turbine may be determined or calculated by measuring the time intervals between blades as they pass a measuring point. GB 2,265,221, GB 2,223,103, U.S. Pat. No. 3,984,713 and GB1, 386,035 describe eddy current or inductive sensors which may be used to measure the rotary speed of a bladed shaft.

The sensors described in these documents are speed or torque probes each comprising a strong magnet positioned so that the tips of the blades pass in close proximity to the magnet. When a blade is moving close to the probe magnet, eddy currents are generated in the tip of the blade. These eddy currents generate their own magnetic fields which are detected by a coil located in the probe. A rotating shaft with blades such as that in a gas turbine will therefore generate a series of pulses with the period between pulses representing the period between successive blades as they pass the probe. The series of pulses can therefore be used to determine the speed of the rotating shaft; the speed is calculated from the time measurements between the pulses.

A bladed turbine such as a gas turbine 1 may comprise compressor blades 2 (only a sample shown) mounted on a disc 3 connected to a shaft 4 (see FIG. 2). In such a gas turbine, each blade is typically fixed to the disc with one pin (not shown). It can therefore rotate around its own pin in a range of about +/−20 degrees. However, when a turbine 1 is rotating, the turbine blades 2 are subjected to centrifugal forces acting radially and pushing blades into the radial position and to air pressure forces acting tangentially and against the direction of rotation. A friction force between the pin and the blade bush opposes the forces acting tangentially.

As a result of interaction of these various forces the blades can each vary their position in a range of +/−5 degrees from the radial position.

For a typical compressor blade 240 mm long, the tip of the blade 2 can move in a range of +/−20 mm. Pulses detected by an eddy current speed probe 5 of the known types will therefore be spaced by varying intervals shown as t1, t2, t3, and t4 as shown on FIG. 2. Therefore even when the compressor shaft speed is constant, one may observe a large variation of the measured time periods between the blades. This variation is known as jitter.

Jitter is caused by blades not being in their nominal equally spaced positions. This offset from nominal causes times measured from blade to blade to be different from one to the next, causing it to appear as if the rotational speed is constantly changing. The speed change is not smooth and continuous, but appears as noise.

It has been assumed that displacement from nominal would be fairly stable for a particular start-up, but may vary between start-ups as friction 'locks' the blades in position when the centrifugal forces come into play at relatively low speed. High speed was expected to cause high frictional forces to the pin holding the blade to the central wheel, so that the blade would no longer move. It has, however, been observed that the blades are not locked at high speed, but move slowly during turbine rotation. This is caused by variations in the air pressure force acting on the turbine blades.

Ideally all of the blades should sit with their tips at a nominal radial position. With a fixed speed, any displacement from that nominal position will give a varying period measured from blade to blade. The varying period then gives an apparently varying speed of rotation. This varying period may result in errors. FIG. 3 shows a blade tip displacement of ±7.5% of nominal distance between blades; this gives a time variation of ±15%. Blade positions are shown in solid lines; possible blade positions are shown in dotted lines.

To simplify the descriptions, normalised times will be used, i.e. where 1 represents the time between perfectly positioned blades, irrespective of the actual time.

Thus ±7.5% jitter on each blade will cause the time between blades to vary between Minimum Time between adjacent Blades=1−2(0.075)
=1−0.15=0.85

Maximum Time between adjacent Blades=1+2(0.075)
=1+0.15=1.15

Similarly for ±15% blade jitter:

Minimum Time=1−2(0.15)=1−0.3=0.7

Maximum Time=1+2(0.15)=1+0.3=1.3

When a probe such as an eddy current probe is used to measure speed or torque, pulses from the eddy current probe are processed to extract a time interval between them. Normally, a zero crossing of each pulse is identified and a time between the two consecutive pulse zero crossings is measured using a timer-counter. The timer counter counts a number of reference pulses generated by a high stability signal generator of known frequency and this number is multiplied by the duration of the reference period.

FIG. 4 illustrates a typical variation of time intervals between consecutive blades when a shaft is accelerating at a rate of about 2000 rpm/sec from a speed of 1000 rpm. The time variation is caused by the blade jitter of about +/−15%.

Another possible source of error in the determination of the time intervals between blades is the failure to detect a blade. It might happen that the, e.g., speed probe will not detect the presence of the blade and will not produce a pulse signal. This might be caused by a damaged blade (e.g. bent or broken tip), or simply the pulse amplitude might be too small to be detected by the processing circuitry.

Missing pulses mean that apparent time between the blades appears much longer and therefore result in a low speed reading. Considering only ±7.5% blade jitter, at a constant speed, the normalised longest time between adjacent blades is 1.15. The normalised times between pulses with a missing intermediate pulse are shown in FIG. 5.

For a missing pulse, minimum time before next blade could appear is $T$min=1+1−2(0.075)=1.85

Maximum time is given by:

$T$max=1+1+2(0.075)=2.15

A single missing pulse gives a normalised time of 2; and a block of 5 missing pulses give a normalised time of 6.

FIGS. 5 and 6 show that when a blade pulse is missing the time interval is substantially longer than the normal time interval. For more pulses missing this interval will be proportionally longer.

A further source of possible error in the determination of the shaft speed is the existence of spurious pulses. A spurious pulse is a pulse (produced by, e.g., a speed probe) between the pulses which originate from one of the blades as it passes one probe. Spurious pulses may be caused by any noise source. There could be several sources of noise including: RF electromagnetic interference and/or low frequency magnetic fields (for example, starter motor pulses or, ignitor current pulses).

A spurious pulse might not be distinguishable from a blade pulse and therefore will cause that the apparent time between the blades is much smaller resulting in a high speed reading (i.e. low time interval).

The position of a spurious pulse could be anywhere between two blade pulses giving a normalised time of between 0 and 1.0 (see FIG. 7).

If a spurious pulse occurs half way between two blades, the normalised times of detected pulses for 7.5% jitter as shown in FIG. 7 will be: 1, 0.5, 0.5, 1.075.

FIG. 8 shows a situation when 5 spurious pulses are present in every other time interval. The normalised time would be as follows: 1, 0.05, 0.5, 1, 0.5, 0.5, 1, 0.5, 0.5, 1, 0.5, 0.5, 1, 0.5, 0.5, 1, The problems of jitter, missing and spurious pulses discussed above make it difficult to accurately measure the speed of rotating shafts such as gas turbine shafts. However, there is a clear and necessary demand for a turbine shaft speed measuring system which can provide accurate speed readings under severe conditions (which may include several damaged blades resulting in missing pulses, or several spurious pulses), and should operate reliably under different shaft acceleration and deceleration conditions.(which requires some compensation for, or reduction of filter effects).

The challenge of determining the speed of a rotating shaft such as a gas turbine from the sensing of the blades can be characterised as how to improve the accuracy of linearly varying signals measured in discrete time intervals. FIG 1 shows an example of signal increasing with time.

The invention in a second aspect provides a method of repeatedly revising an assessment, calculated by predicting over a sequence of successive signals, of the frequency of recurrence of signals which signals may recur at unequal time intervals, individual ones of which may be absent, and spurious ones of which may occur, comprising the steps of: deriving from the existing value of the assessment the interval until the next expected signal, checking for the presence of the said next signal within a range of times about the said expected time, the range being a proportion of the said interval, and, if the said next signal is present with-in the said range, using the actual new time interval to replace the time interval between the first and second signals of the sequence in recalculating the assessment, but if there is no new signal within the said range, using the previously derived time interval to replace the time interval between the first and second signals of the sequence in recalculating the assessment.

The invention could be characterised as the combination of linear prediction with a limiter. The limiter is an integral part of the predicting process and is used to eliminate large signal fluctuations that could affect linear prediction, without affecting noise and jitter. 'Symmetrical' noise means that the predictor operates correctly and tracks slowly changing signals.

As mentioned above, the inventors of the subject invention are the first to appreciate that the counter-intuitive step of using predicted rather than actual values as the output, combined with the use of a limited predictor reduces the problems associated with the noise which may be generated as well as spurious and/or missing signals.

A preferred embodiment of the present invention will be described, by way of example only, with reference to the attached figures. The figures are only for the purposes of explaining and illustrating a preferred embodiment of the invention and are not to be construed as limiting the claims. The skilled man will readily and easily envisage alternative embodiments of the invention in its various aspects. As described above, the invention is suitable for the processing of any sequence of signals or measurement which may vary over time. Whilst the following description and the preceding description of the problems of some of the known methods and apparatus concentrate on the systems for monitoring the speed of a rotating shaft with blades such as turbine, the skilled man can easily envisage how the invention could be implemented to process any measurements or signals which may vary over time.

In a preferred embodiment of the present invention, the speed of an individual gas turbine having, say, twenty-nine blades is measured using a speed probe such as the eddy current probe described in GB 2,265,221 which measures the time interval between changes in the current induced therein and having its output connected to data processing apparatus. The data processing apparatus may be a digital engine control unit.

Figure 1:
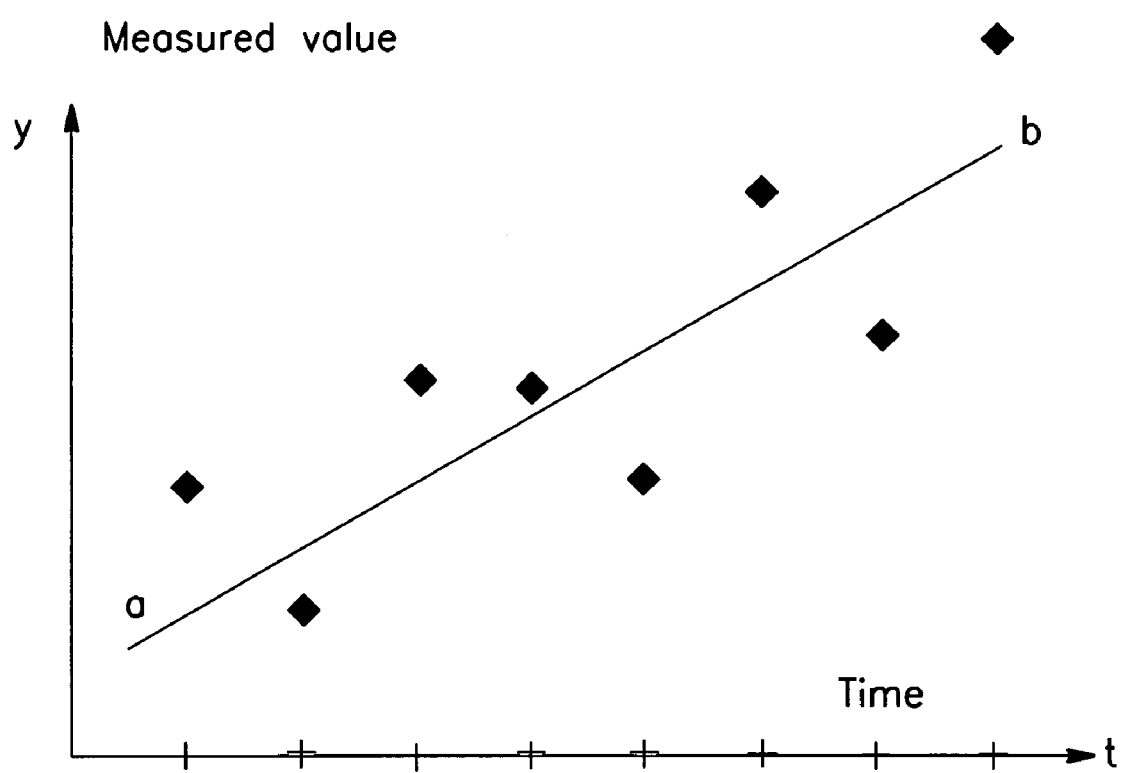
FIG. 1 is a graph showing a parameter which has a measured value varying with time.
Figure 2:
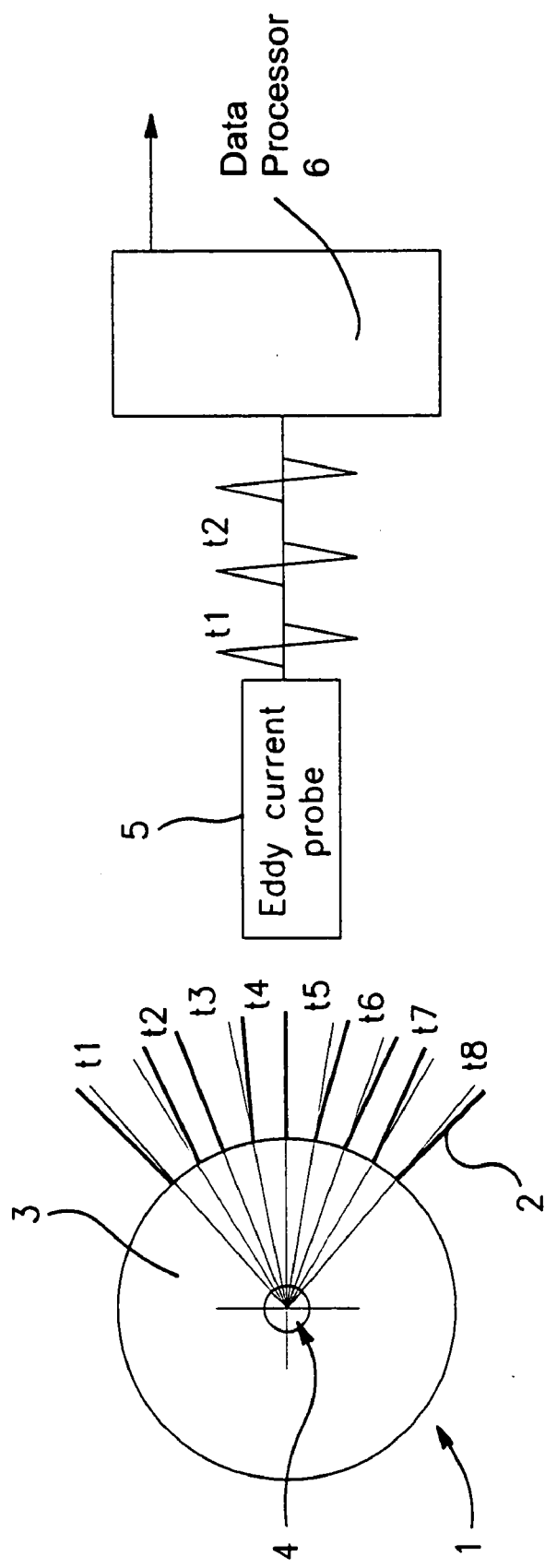
FIG. 2 is a schematic illustration of a speed probe set up to determine the time intervals between successive pages of the blades of a turbine as they move past the probe.
Figure 3:
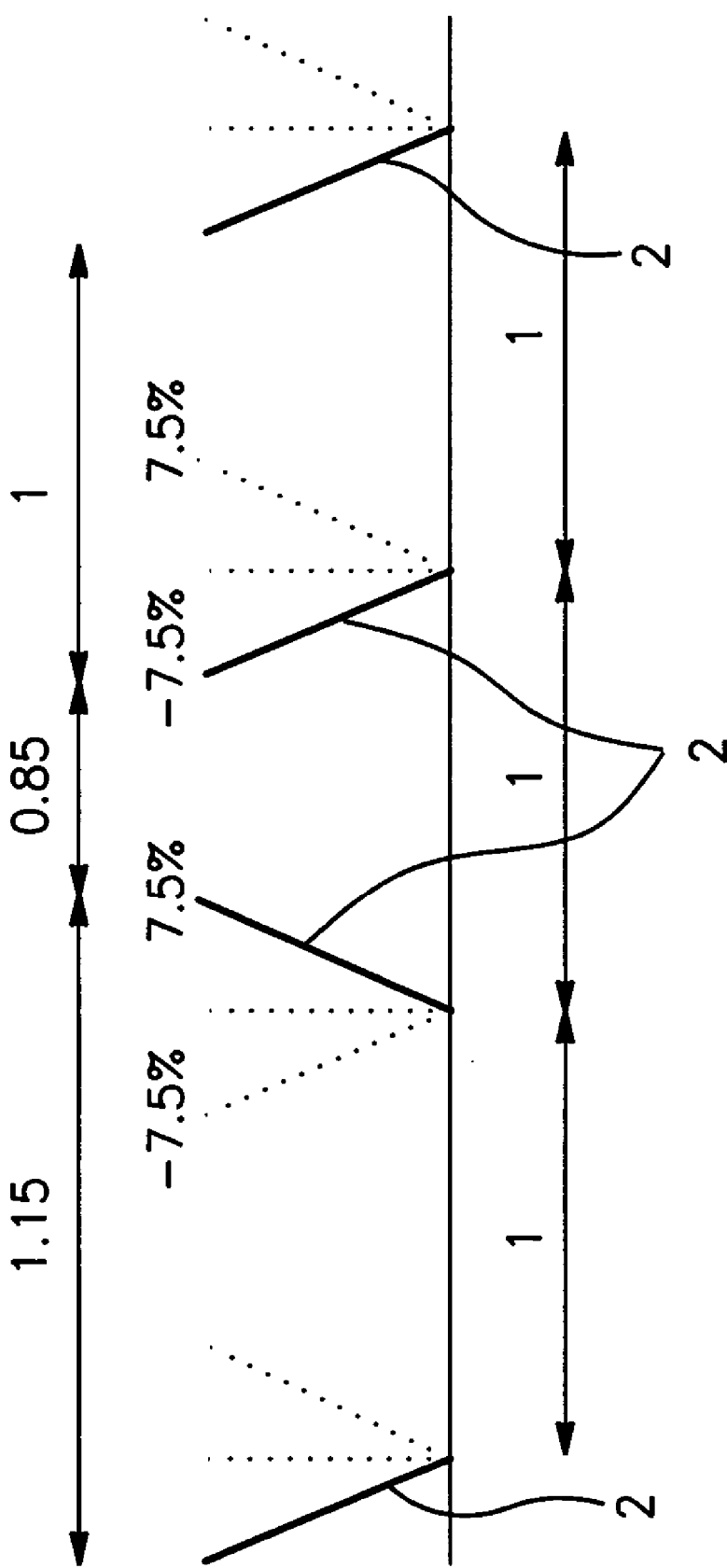
FIG. 3 is a diagram illustrating the effect of blade jitter on the blades of a turbine such that of FIG. 2.
Figure 4:
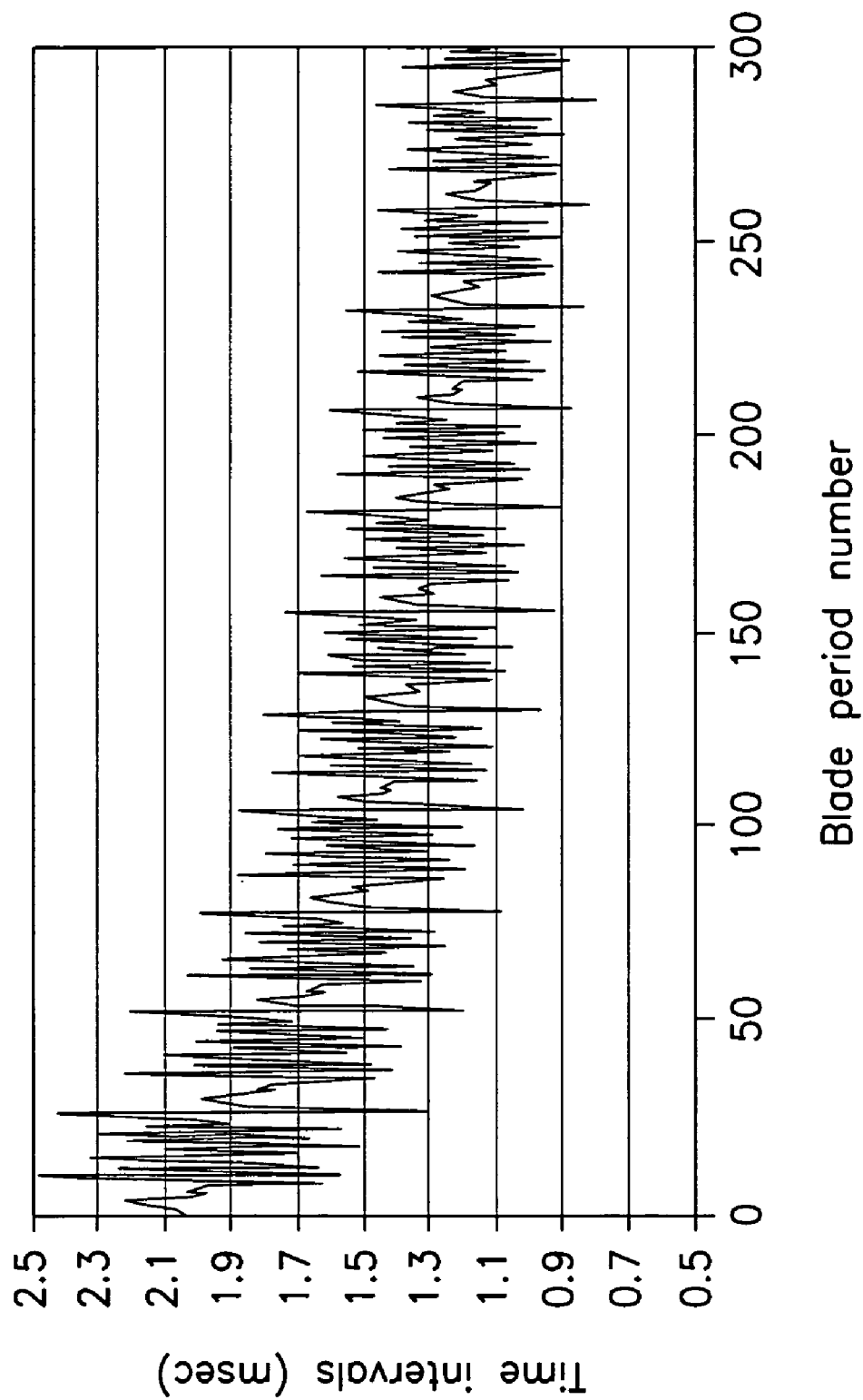
FIG. 4 illustrates a typical variation of time intervals between consecutive blades when the shaft of FIG. 2 is accelerating at a rate of about 2000 rpm/s from a speed about 1000 rpm.
Figure 5:
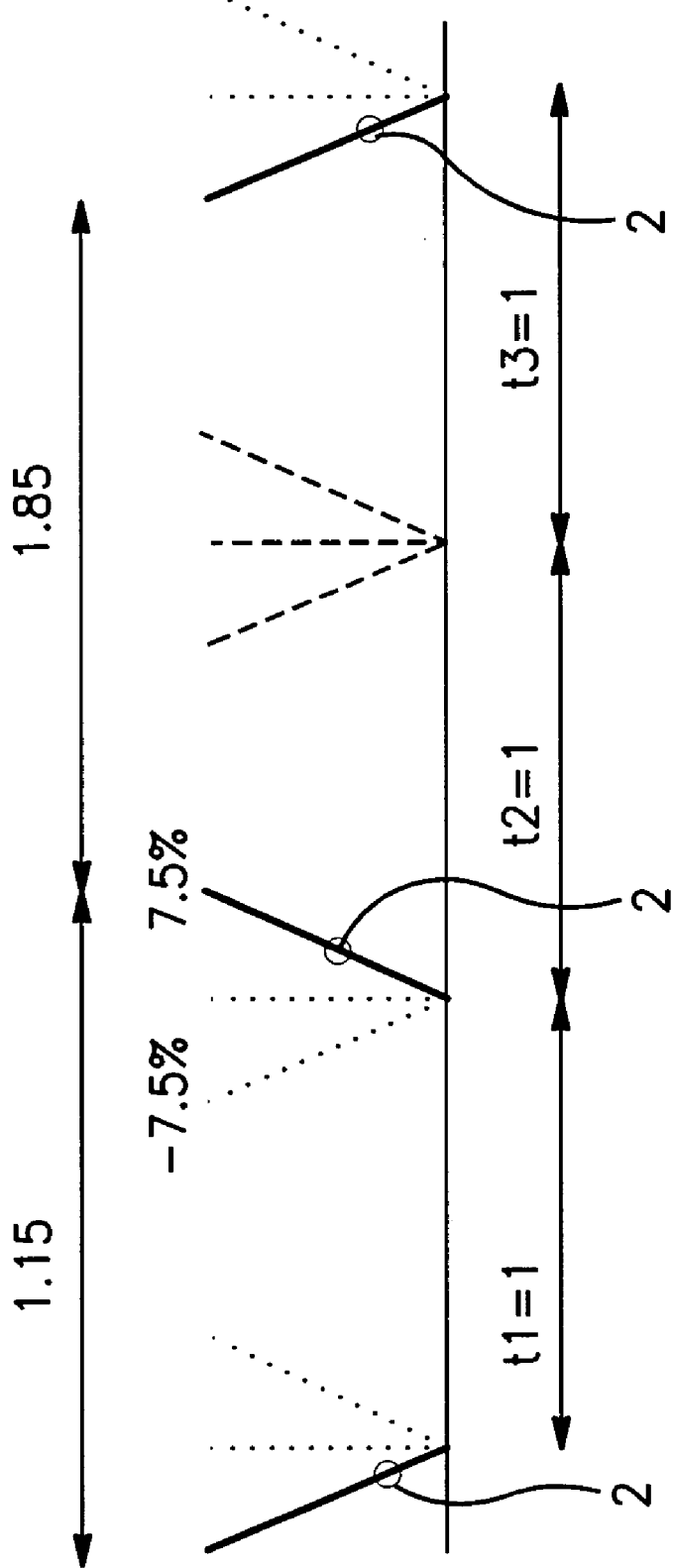
FIG. 5 is a diagram illustrating the effect of missing pulses on the turbine of FIG. 2.
Figure 6:
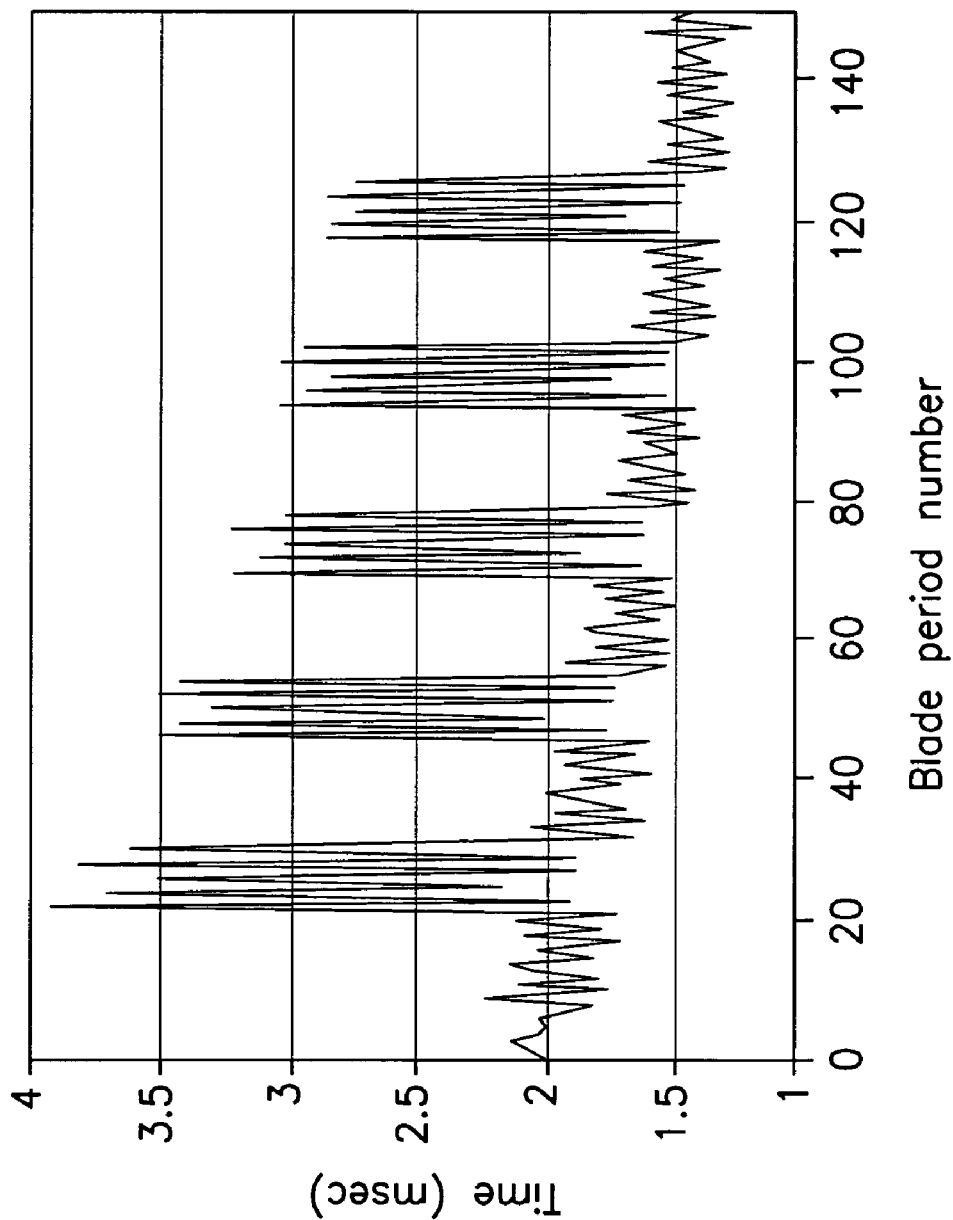
FIG. 6 illustrates a typical variation of the intervals between consecutive blades for the shaft of FIG. 2 rotating at 1000 rpm and accelerating at 2000 rpm/s when blade pulses are missing.
Figure 7:
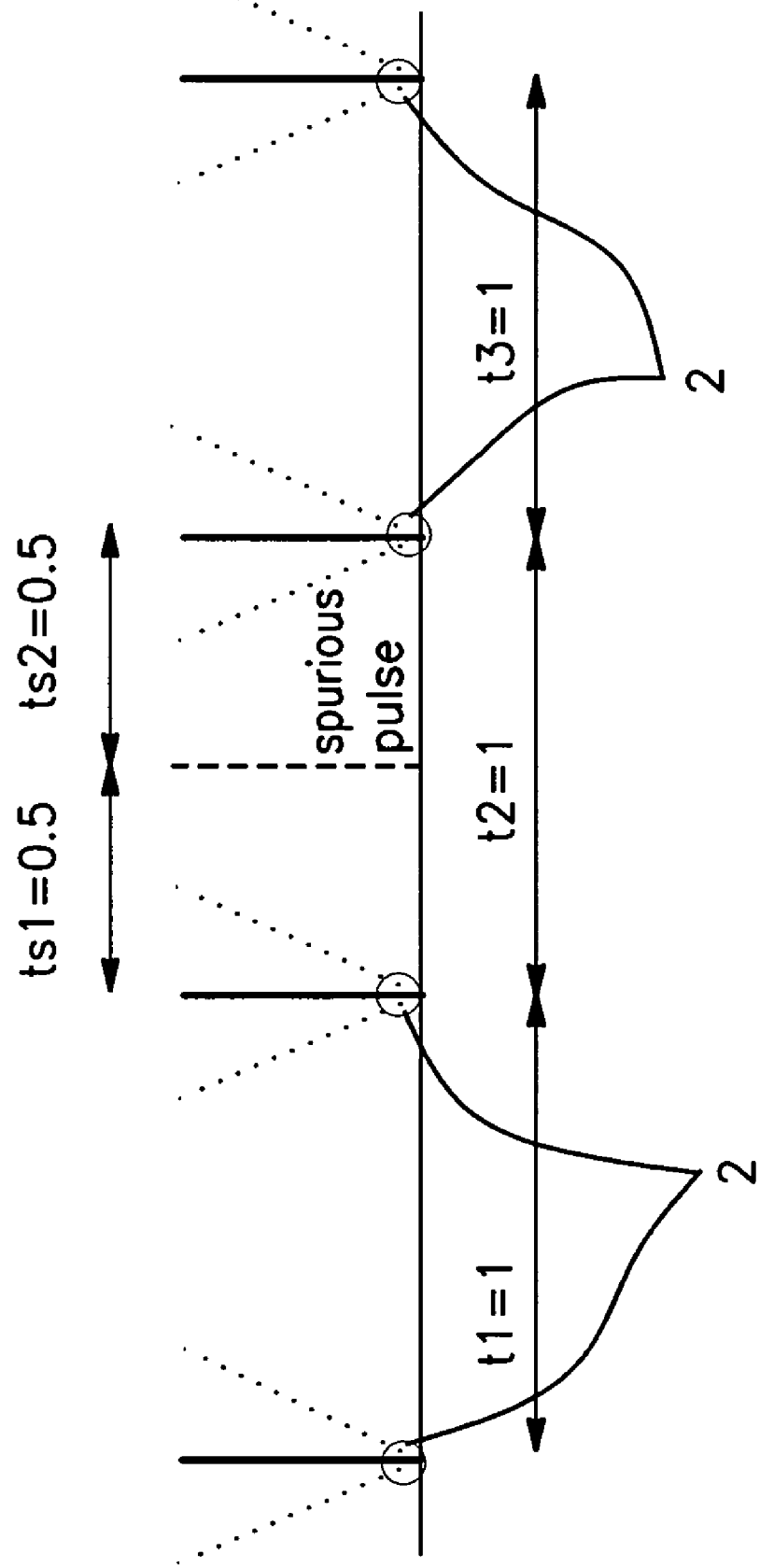
FIG. 7 is a diagram illustrating the effect of a spurious pulse on the turbine of FIG. 2.
Figure 8:
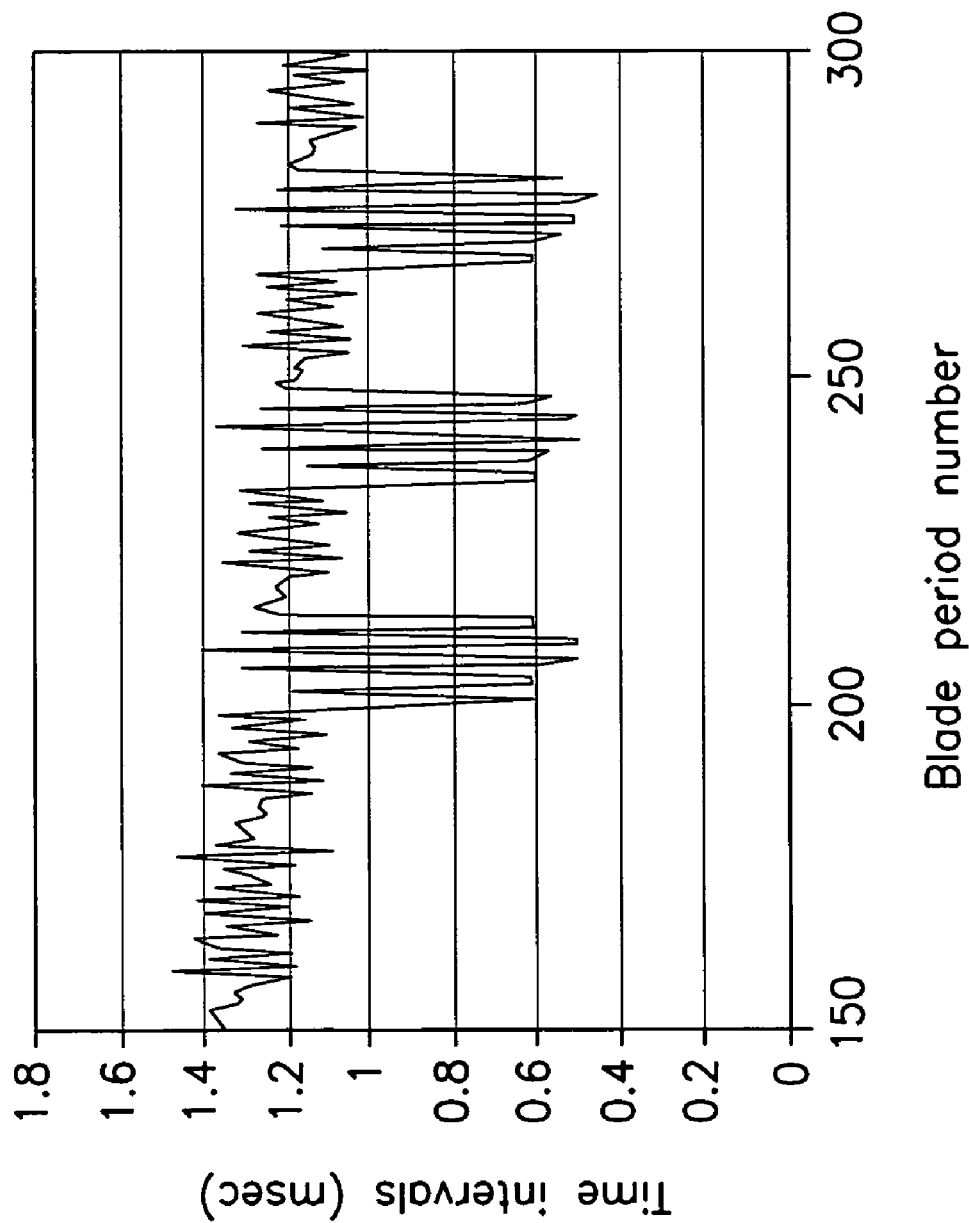
FIG. 8 illustrates a typical variation of time intervals between consecutive blades for the shaft of FIG. 2 rotating at about 2000 rpm and accelerating at 2000 rpm/s when a number of spurious pulses are present in each revolution.

Referring to FIG. 2, a shaft 4 has a disc 3 connected thereto. The disc has twenty-nine blades 2 (not all shown) fixed thereto at equal points spaced around the shaft's circumference. Each blade 2 is fixed to the disc by a pin (not shown). As discussed above, each blade 2 can therefore rotate about its pin in a range of about +/−20 degrees.

The speed probe 5 is located near the path of the rotating blades and notes the passage of each blade tip as it passes the sensor 5. The probe produces a pulse as a tip passes it. As discussed above, there may be significant noise produced by the jitter, missing and spurious pulses. The time intervals ($t_1$, $t_2$, etc) between successive pulses are determined and used to calculate the speed of the shaft in the manner well-known to the skilled man.

Figure 9:
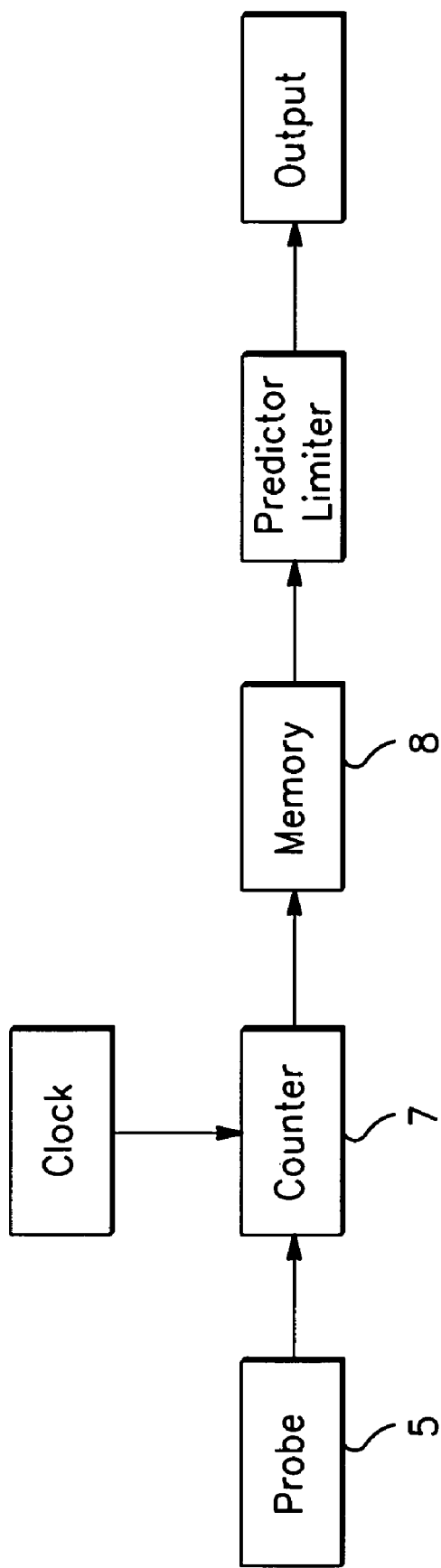
FIG. 9 is a flow diagram illustrating the method of an embodiment of the present invention.

A data processor 6 (see FIGS. 2 and 9) coupled to the speed probe 5 receives as an input the sequence of pulses generated by the probe. The data processor includes a counter 7 which determines the time interval between successive signal pulses. These are stored in a memory 8. When there are sufficient time interval values stored in the memory, a time interval trend time is calculated from the stored time interval values.

The number of required historical values used to produce the trend line must be optimised to provide accurate tracking speed and response to rapid speed changes. The number of historical values used to calculate the trend line is the length (a number of averaged periods) of the trend line. A short trend line will result in largely noisy predicted values, because it is averaging over a small number of data points. A long trend line will cause slow response in case of speed changes and a large error in case the average slope of the time interval curve is not linear. The length of the trend line must be set for each type of engine using its experimental data.

The 'Length' of the predictor is determined by the time needed for the averaged value of noise to be close to zero. For example, for a turbine shaft with 29 blades the average jitter value is zero after 29 periods, therefore the predictor length should be 29 periods for a system measuring the speed of such a turbine.

For the gas turbine shaft of FIG. 2 having twenty nine blades the linear trend line based on the previous twenty-nine blade periods is then calculated the method of least squares. In other words a straight line is fitted to the twenty nine most recent time intervals stored in the memory and is determined in the form of an equation:

$$y = mx + b \tag{1}$$

where x is the blade period number.

Any of the known trend line generation methods may be used. The trend line also need not be linear. Clearly in certain circumstances the trend line may be a curve (i.e. a quadratic or higher order trend line).

Figure 10:
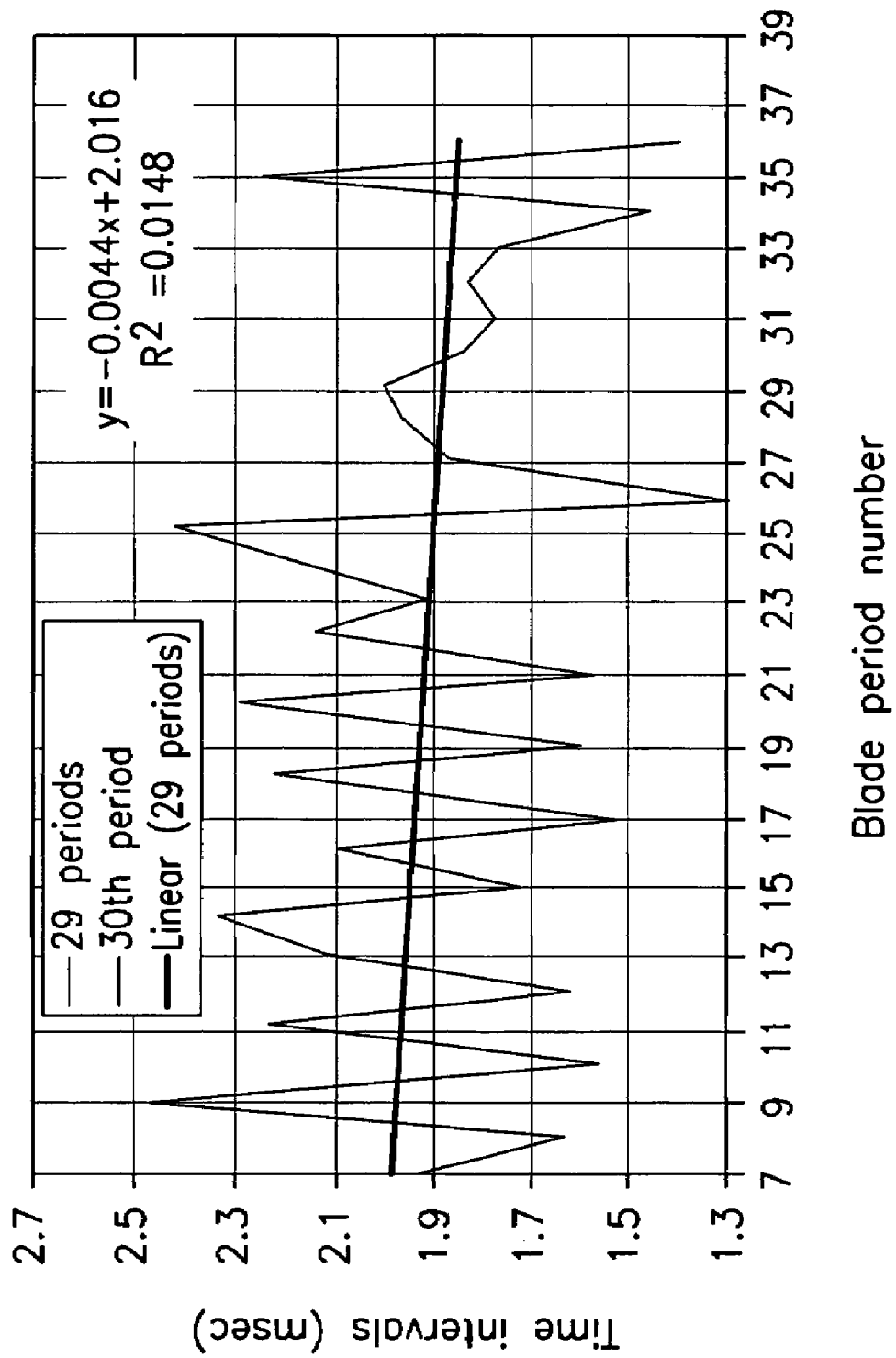
FIG. 10 illustrates the principle of the preferred embodiment of FIG. 9.

For example using the values of FIG. 10 and using the time intervals of periods 7 to 35 to determine the predicted value for the $36^{th}$ time interval or blade period:

for x=36

$y = 0.0044 * x36 + 2.016$ $$y = 1.8576 \tag{3}$$

Next the limiter is applied. For a limiter set at 40% the algorithm looks like follows: IF the new value is larger than the predicted value times 1.4, OR is smaller than the predicted value times 0.6, THEN the new value is rejected and the predicted value is accepted as a new value. ELSE a new value is accepted. e.g. (See FIG. 10)

| predicted value | new value | accepted value | output value |
|---|---|---|---|
| 1.8576 (7-35) | 1.407 | 1.407 | 1.8576 |
| 1.8576 | 3.5 | 1.8576 | 1.8576 |
| 1.8576 | 0.7 | 1.8576 | 1.8576 |
| 1.7929 (8-36) | 2.01 | 2.01 | 1.7929 |

Next, the accepted value is used to calculate the next trend line for periods 8 to 36
For the accepted value=1.407
a new trend line is y=−0.0073 x+2.063
the predicted value for x=37, y=1.7929
and the above process is repeated.
Length (a number of averaged periods) of the trend line The chosen value of the limiter is determined by the value of maximum jitter. During normal operation the limiter should not limit the jitter but should detect missing pulses and spurious pulses.

Figure 11:
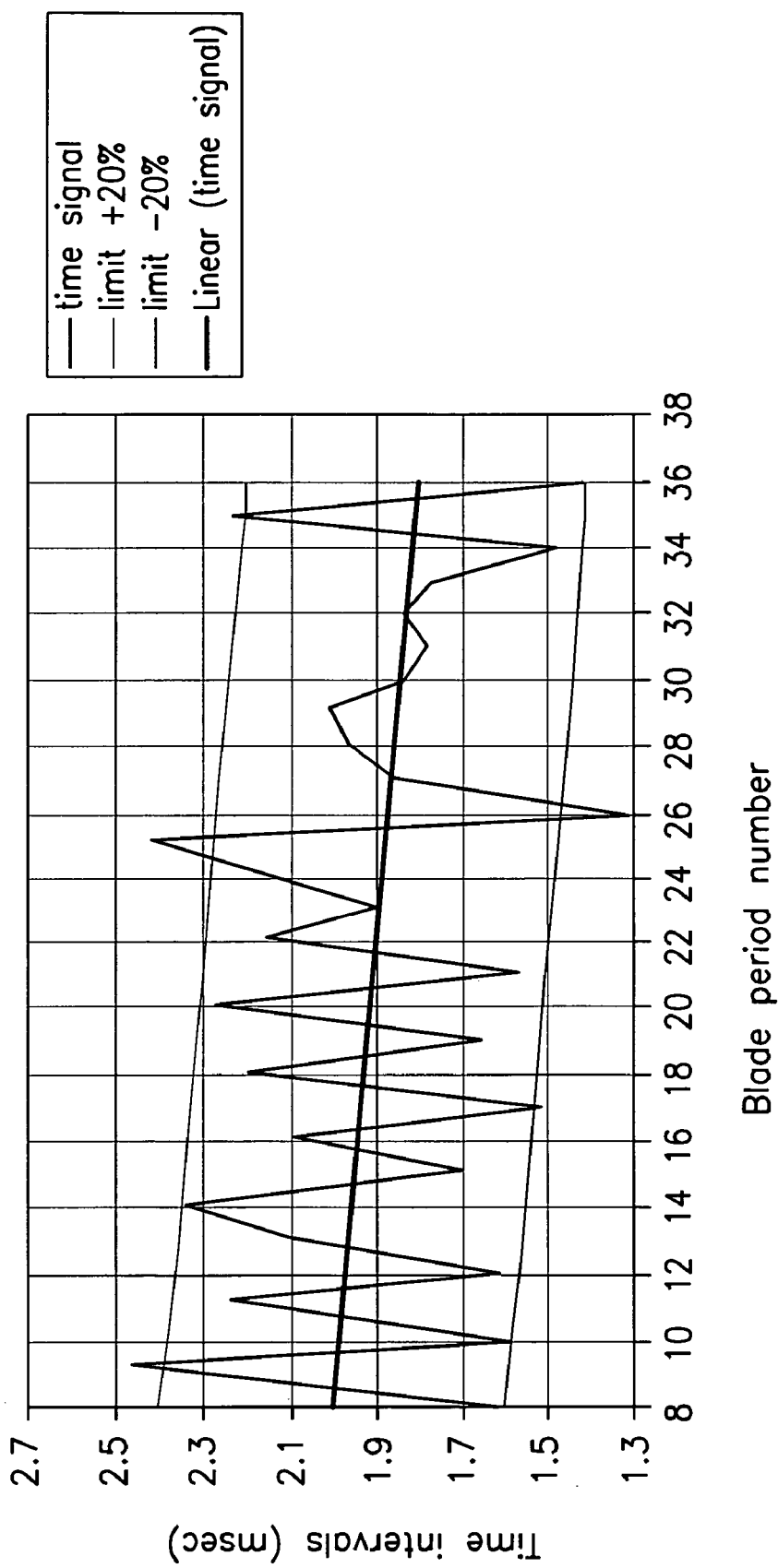
FIG. 11 illustrates the principle of FIG. 10 using a limiting range of +/−20%.

The limit shown on FIG. 11 was set to +/−20%. For such a level of the limit the signal from several periods will be limited i.e. periods 9, 17, 25, 26, 35 resulting in the trend line not following the average speed. For proper time signal tracking shown in FIG. 11 the limiter should be set to +/−30%.

Figure 12:
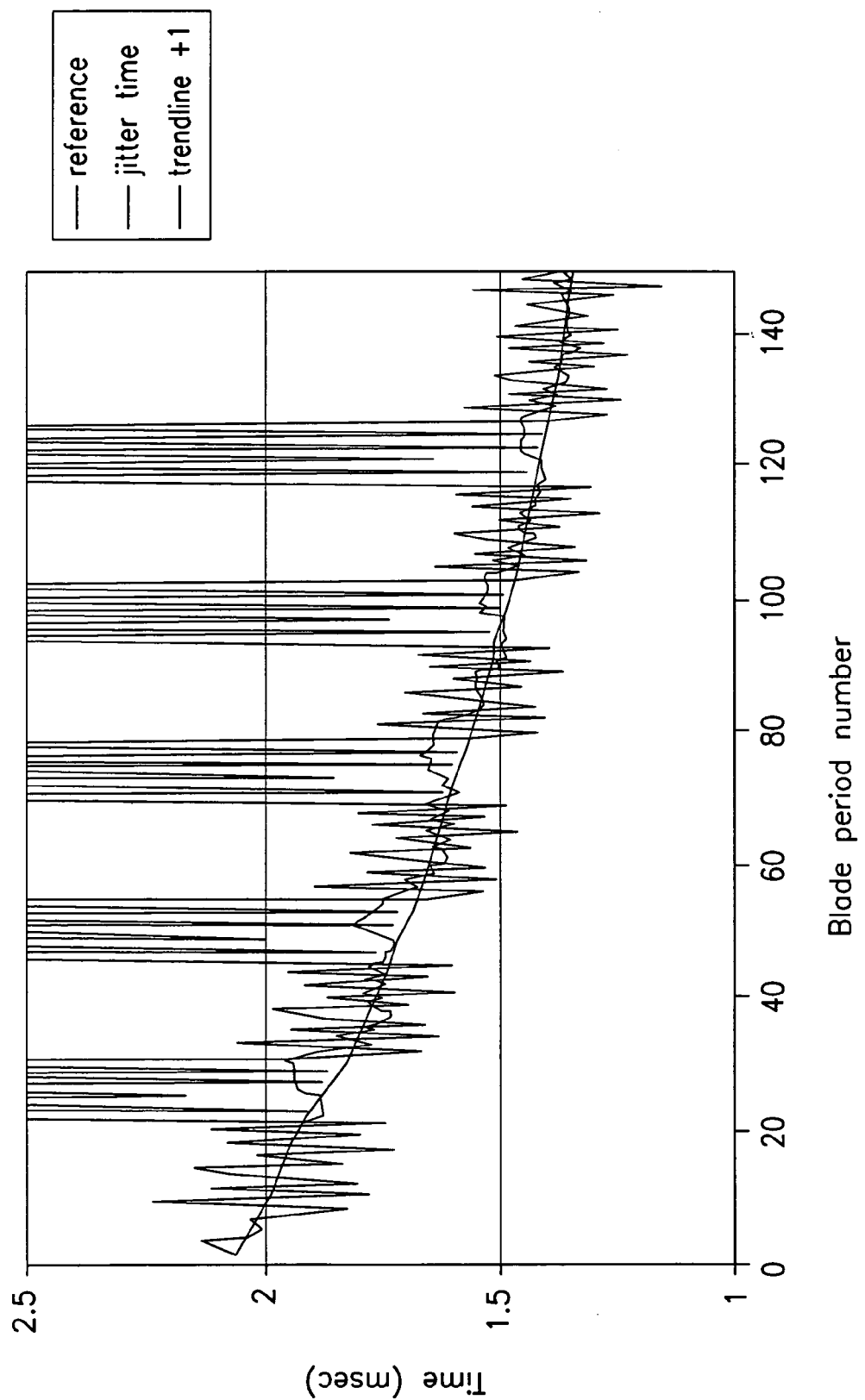
FIG. 12 illustrates an output signal after processing using the embodiment of FIGS. 2 and 9 to 12.

As a result of performing the above described calculations the measured time signal shown in FIG. 11 is transformed at the output and shown in FIG. 12 as 'trendline+1'. In spite of many missing blades the error is less than 6%.

The accuracy of speed calculation depends on the amount of jitter, acceleration/deceleration rate, the length of a trend line and the level of limit.

The invention claimed is:

1. A method of generating a series of output signals representative of a series of time interval signals, including the steps of:
   (a) creating a trend line from a number of historical time interval signal values;
   (b) predicting a first output time interval signal value from said trend line;
   (c) measuring a first new time interval signal value;
   (d) comparing the measured first new time interval signal value to the predicted first output time interval signal value;
   (e) if the measured first new time interval signal value is within a pre-determined range of acceptable values, using the measured first new time interval signal to update said trend line and if the measured first new time interval signal value is outside the pre-determined range of acceptable values, using the predicted first output time interval signal value to update said trend line; and
   (f) repeating steps (a) to (e) to predict at least a second output time interval signal value.

2. A method according to claim 1 wherein measurement signals are predicted by extrapolation from a sequence of at least two historical time interval signal values.

3. A method according to claim 2 wherein a linear trend line is extrapolated from the at least two historical time interval signal values.

4. A method according to claim 3 wherein the linear trend line is generated using the method of least squares.

5. A method according to claim 2 wherein a quadratic trend line is extrapolated from at least three historical time interval signal values.

6. A method according to claim 1 wherein the pre-determined range of acceptable values is a defined range around the predicted value of the first output time interval signal value.

7. A method according to claim 6 wherein the defined range is +/−40% of the predicted value.

8. A method according to claim 7 wherein the defined range is +/−30% of the predicted value.

9. A method according to claim 8 where the defined range is +/−20% of the predicted value.

10. A method according to claim 1 for monitoring the speed of rotation of a body having features at a pre-determined separation which are sensed as they pass a sensor, wherein the time between the passage of successive features defines a time interval which is represented by a time interval signal, and the speed is determined from the pre-determined separation between features and the output time interval signal value corresponding to the time interval between said features.

11. A method according to claim 10 for monitoring the speed of a rotating shaft having blades, wherein the blades each comprise one of the said features.

12. A method according to claim 11 wherein, for a rotating shaft having a complement of X blades wherein X is an integer, the value for a first time interval signal is predicted by averaging over the previous X time intervals.

13. A method of repeatedly revising an assessment of time interval signal values, said values calculated by predicting, over a sequence of successive signals, the frequency of occurrence of signals, which signals may occur at unequal time intervals, individual ones of which may be absent, and spurious ones of which may occur, comprising the steps of:
   deriving from an existing value of the assessment a predicted time interval until a predicted time at which a next expected signal is expected to occur in the sequence,
   measuring an actual time interval between successive signals,
   checking for occurrence of a next expected signal within a range of times about the said predicted time, the range being a proportion of the predicted time interval, and
   if said next expected signal occurs within said range, using the actual measured time interval to replace the predicted time interval between the successive signals of the sequence in recalculating the assessment,
   if there is no new signal within said range, using the predicted time interval to replace the actual time interval between successive signals of the sequence in recalculating the assessment.

14. A method according to claim 1 for monitoring the speed of rotation of a gas turbine shaft.

15. A method according to claim 14 wherein the time interval signal values represent the time interval between the passage of blades mounted on the gas turbine shaft, as the blades pass a sensor placed at a measuring point.

16. A method according to claim 15 wherein the tips of the blades can move relative to each other.

17. A method according to claim 15 wherein the blades are compressor blades.

18. A method according to claim 16 wherein the pre-determined range of acceptable values is selected so as to include variations in the time interval signal values caused by the relative movement of the tips of the blades and to exclude variations in the time interval signal values caused by either the failure of the sensor to sense the passage of a blade, or the false sensing of a spurious blade by the sensor.

19. A method of generating a series of output signals representative of a series of time interval signals produced by blades mounted on a rotatable gas turbine shaft as the blades move past a sensor, the method including the steps of:
   (a) creating a trend line from a number of historical time interval signal values;
   (b) predicting a first output time interval signal value from a trend line;
   (c) measuring a first new time interval signal value;
   (d) comparing the measured first new time interval signal value to the predicted first output time interval signal value, and
   (e) if the measured first new time interval signal value is within pre-determined range of acceptable values, using the measured first new time interval signal value to update the trend line and, if the measured first new time interval signal value is outside the pre-determined range of acceptable values, using the predicted first output time interval signal value to update the trend line; and
   (f) repeating steps (a) to (e) to predict at least a second output time interval signal value from said updated trend line.

* * * * *